(12) United States Patent
Chun

(10) Patent No.: US 9,002,153 B2
(45) Date of Patent: Apr. 7, 2015

(54) OPTICAL FIBER CABLE NET AND METHOD FOR PRODUCING THE SAME

(71) Applicant: Hong Gi Chun, Seoul (KR)

(72) Inventor: Hong Gi Chun, Seoul (KR)

( * ) Notice: Subject to any disclaimer, the term of this patent is extended or adjusted under 35 U.S.C. 154(b) by 89 days.

(21) Appl. No.: 13/865,548

(22) Filed: Apr. 18, 2013

(65) Prior Publication Data

US 2014/0314383 A1    Oct. 23, 2014

(51) Int. Cl.
*G02B 6/26* (2006.01)
*G02B 21/00* (2006.01)
*G02B 6/44* (2006.01)
*B21F 27/02* (2006.01)
*G08B 13/12* (2006.01)

(52) U.S. Cl.
CPC .............. *G02B 6/4415* (2013.01); *B21F 27/02* (2013.01); *G02B 6/4469* (2013.01); *G08B 13/124* (2013.01)

(58) Field of Classification Search
USPC ............................................. 385/13; 340/550
See application file for complete search history.

(56) References Cited

U.S. PATENT DOCUMENTS

| 7,123,785 B2 * | 10/2006 | Iffergan | 385/13 |
| 8,325,038 B2 * | 12/2012 | Cho | 340/540 |
| 2006/0083458 A1 * | 4/2006 | Iffergan | 385/13 |

FOREIGN PATENT DOCUMENTS

| JP | 2002-001471 A | 1/2002 |
| KR | 20-0180749 Y1 | 2/2000 |
| KR | 20-0420665 Y1 | 6/2006 |
| KR | 20-0437409 Y1 | 11/2007 |

* cited by examiner

*Primary Examiner* — Eric Wong
(74) *Attorney, Agent, or Firm* — Rabin & Berdo, P.C.

(57) ABSTRACT

The present invention relates to an optical fiber cable net including: one elongated optical fiber cable having a front end portion repeatedly moved upward and downward from the lower end portion of the left side of a bee hive-like section along a line forming the bee hive-like section, the optical fiber cable being wound by a plurality of times onto pre-disposed portions where it meets the pre-disposed portions and being moved upward or downward, so that if the front end portion of the optical fiber cable reaches the lower end portion of the right side of the bee hive-like section, the front end portion of the optical fiber cable is sequentially passed through the respective net eyes of the right side of the bee hive-like section, the respective net eyes of the upper side thereof and the respective net eyes of the left side thereof.

2 Claims, 4 Drawing Sheets

(a)  (b)

OPTICAL FIBER CABLE NET AND METHOD FOR PRODUCING THE SAME

BACKGROUND OF THE INVENTION

1. Field of the Invention

The present invention relates to an optical fiber cable net that is installed as a sensor on a security fence and a method for producing the same, and more particularly, to an optical fiber cable net that is configured to have a bee hive-like section with one elongated optical fiber cable and a method for producing the same.

2. Background of the Related Art

So as to protect specific facilities or areas, generally, security fences are installed around them, and further, the patrol of the specific facilities or areas is conducted by security guards. Recently, an optical fiber cable net as a sensor is mounted on the security fence, and if the light passing through an optical fiber cable is dispersed, the dispersion of the light is sensed by the optical fiber cable net system, thereby monitoring the invasion.

According to the conventional security system, first, the optical fiber cable net is formed in a zigzag pattern with the optical fiber cables and then mounted on the security fence. In this case, the eyes of the optical fiber cable net are formed to such sizes as to keep a person from passing therethrough and further to prevent the eyes from being expanded by an invader or escaper, thereby avoiding the invasion or escape through the eyes of the optical fiber cable net.

So as to permit the optical fiber cable net to have a given pattern and also to prevent the sizes of the eyes of the optical fiber cable net from being expanded by the invader or escaper, as shown in FIG. 1, optical fiber cables 10 are located near each other at a given distance, and the neighboring optical fiber cable portions are fixed to each other by means of a clip 20.

Alternatively, as shown in FIG. 2, an optical fiber cable 10 forms the optical fiber cable net in a knitting manner, and so as to prevent the sizes of the eyes of the optical fiber cable net from being expanded, the neighboring optical fiber cable portions are fixed to each other by means of a clip 20.

According to the conventional methods for producing the optical fiber cable net, however, numerous clips should be additionally made to fix the neighboring optical fiber cable portions to each other, and besides, the fixing operations should be conducted one by one through workers, so that unfortunately, the manufacturing and fixing costs of the clips reach half of the manufacturing cost of the optical fiber cable net and further a lot of time is needed to conduct the fixing.

SUMMARY OF THE INVENTION

Accordingly, the present invention has been made in view of the above-mentioned problems occurring in the prior art, and it is an object of the present invention to provide an optical fiber cable net and a method for producing the same that does not need any fixing clips.

To accomplish the above object, according to the present invention, there is provided an optical fiber cable net including: one elongated optical fiber cable having a front end portion repeatedly moved upward and downward from the lower end portion of the left side of a bee hive-like section along a line forming the bee hive-like section, thereby allowing the optical fiber cable to be disposed along the line forming the bee hive-like section, the optical fiber cable being wound by a plurality of times onto pre-disposed portions where it meets the pre-disposed portions and being moved upward or downward, so that if the front end portion of the optical fiber cable reaches the lower end portion of the right side of the bee hive-like section, the front end portion of the optical fiber cable is sequentially passed through the respective net eyes of the right side of the bee hive-like section, the respective net eyes of the upper side thereof and the respective net eyes of the left side thereof until the front end portion of the optical fiber cable reaches the lower end portion of the left side of the bee hive-like section, thereby finishing producing the optical fiber cable net.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
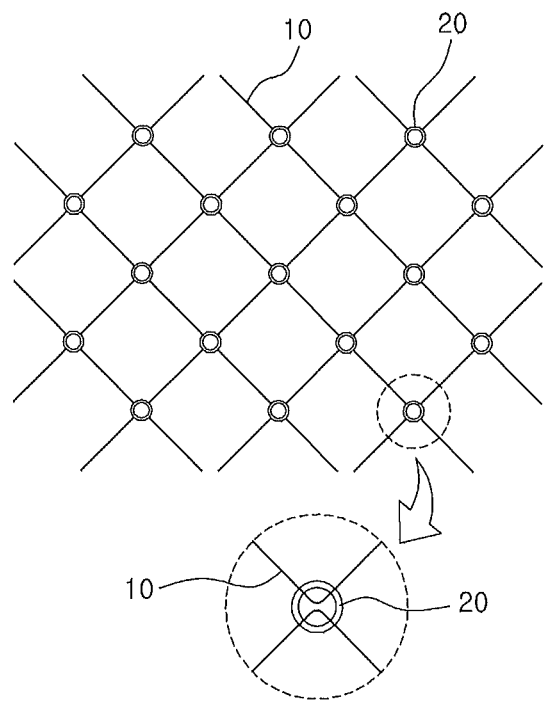
FIG. 1 and FIGS. 2a and 2b are exemplary views showing conventional optical fiber cable nets.
Figure 2:
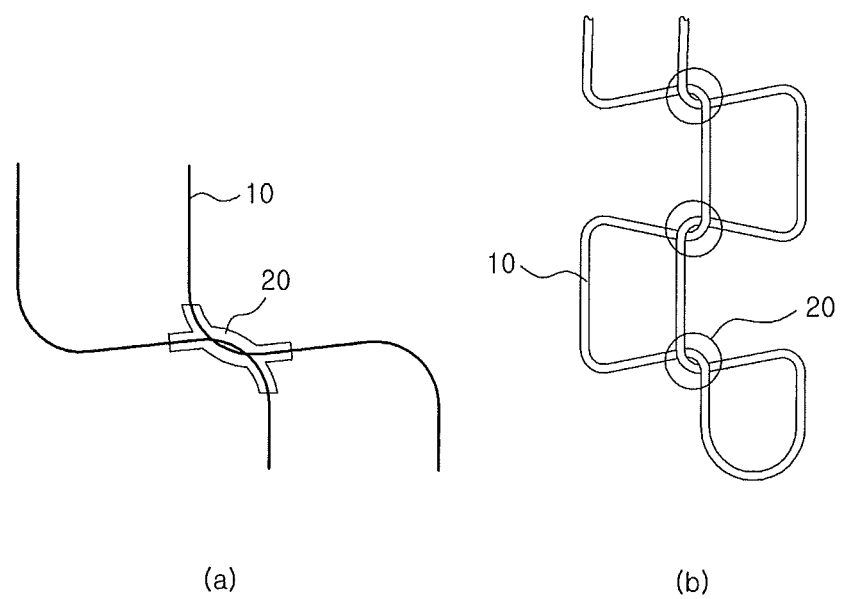
Figure 3:
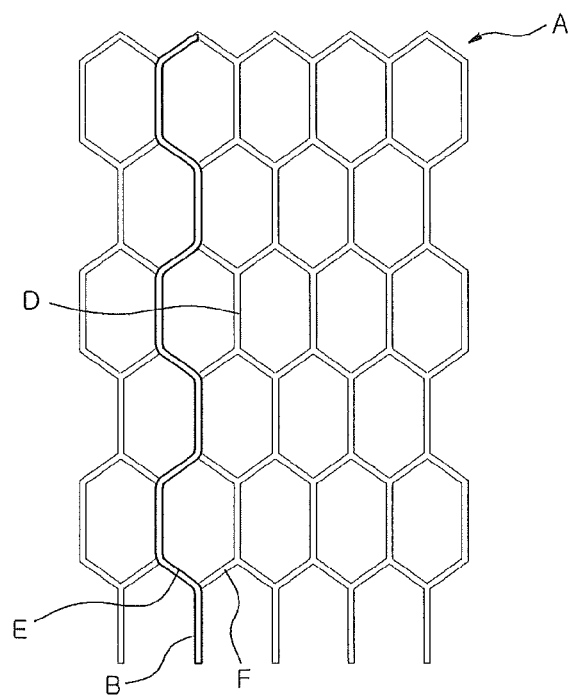
FIG. 3 is an exemplary view showing an optical fiber cable net according to the present invention, wherein a front end portion of an optical fiber cable is moved upward along a line forming a bee hive-like section.
Figure 4:
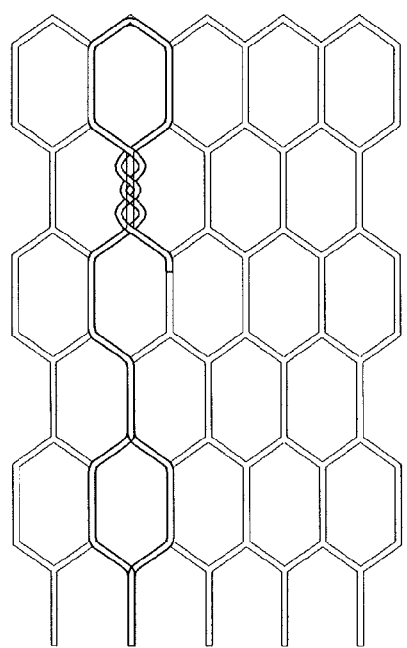
FIGS. 4 and 5 are exemplary views showing the optical fiber cable net according to the present invention, wherein the front end portion of the optical fiber cable is moved downward along a line forming the bee hive-like section.
Figure 5:
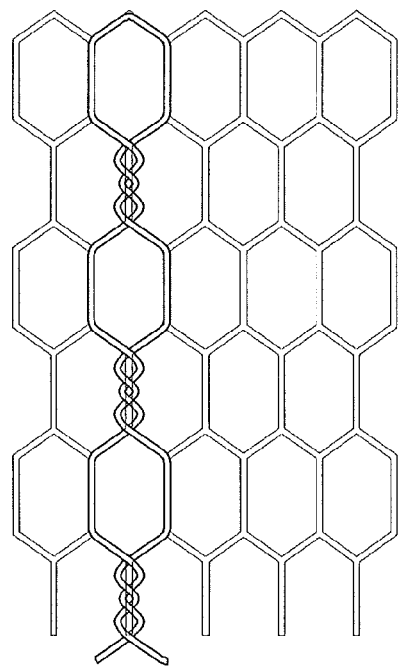
Figure 6:
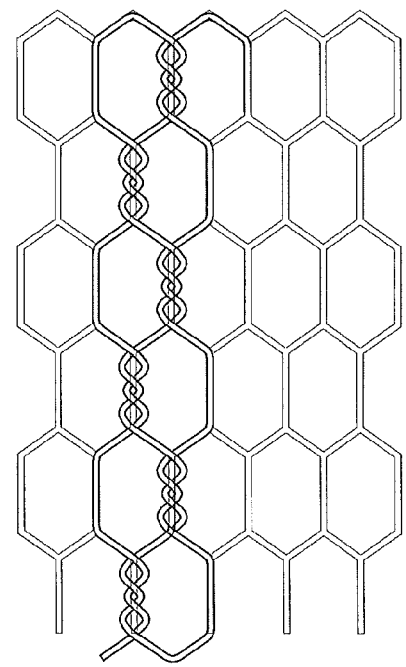
FIG. 6 is an exemplary view showing the optical fiber cable net according to the present invention, wherein the front end portion of the optical fiber cable is moved upward again along the line forming the bee hive-like section from the state of FIG. 5.
Figure 7:
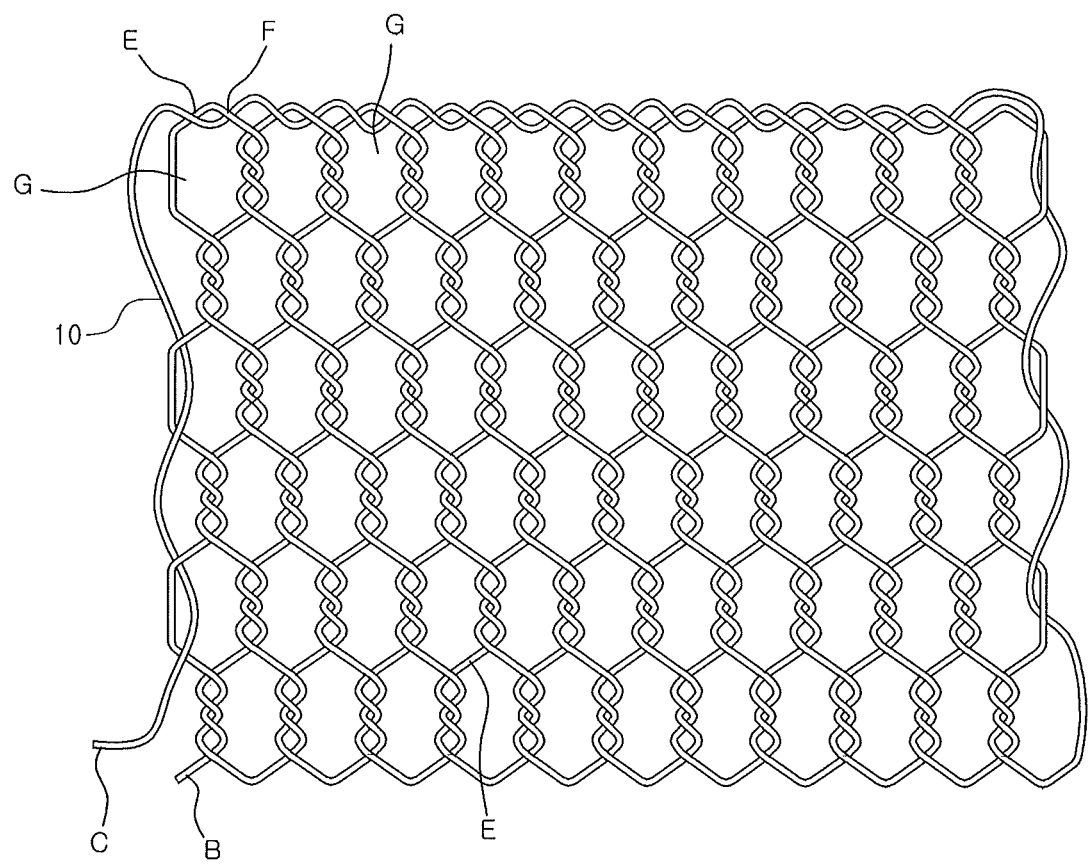
FIG. 7 is an exemplary view showing the optical fiber cable net according to the present invention.

Hereinafter, an explanation on an optical fiber cable net and a method for producing the same according to the present invention will be in detail given with reference to the attached drawing.

A given size of an optical fiber cable net to be manufactured and sizes of eyes G of the optical fiber cable net are first determined, and then, a bee hive-like section A like the optical fiber cable net to be manufactured is determined. Next, a rear end portion B of an elongated optical fiber cable stays on the lower end portion of the left side of the bee hive-like section A, and a front end portion C of the elongated optical fiber cable is moved upward from a linear portion D of the lower end portion of the bee hive-like section A to an upward inclined portion E of the upper end portion thereof along the line forming the bee hive-like section A from the lower end portion of the left side of the bee hive-like section A, thereby being disposed along the line forming the bee hive-like section A.

After that, the front end portion C of the optical fiber cable is moved downward from a downward inclined portion F of the upper end portion of the bee hive-like section A to the downward inclined portion F of the lower end portion thereof, thereby being disposed along the line forming the bee hive-like section A.

Like this, while the front end portion C of the optical fiber cable is being moved downward, it is wound a plurality of times onto pre-disposed portions at the portions where it meets the pre-disposed portions and then moved downward.

Next, the front end portion C of the optical fiber cable is moved upward from the upward inclined portion E of the lower end portion of the bee hive-like section A to the upward inclined portion E of the upper end portion thereof, thereby being disposed along the line forming the bee hive-like section A.

Like this, while the front end portion C of the optical fiber cable is being moved upward, it is wound a plurality of times onto pre-disposed portions at the portions where it meets the pre-disposed portions and then moved upward.

The upward and downward movements of the front end portion C of the optical fiber cable are repeatedly carried out, and if the front end portion C of the optical fiber cable reaches the lower end portion of the right side of the bee hive-like section A, it is passed sequentially through the respective net eyes G of the right side of the bee hive-like section A, the respective net eyes G of the upper side thereof and the respective net eyes G of the left side thereof, thereby reaching the lower end portion of the left side of the bee hive-like section A and thus finishing manufacturing the optical fiber cable net.

The size of each eye G of the optical fiber cable net is determined upon the lengths of the linear portion D, the upward inclined portion E and the downward inclined portion F, and thus, the linear portion D, the upward inclined portion E and the downward inclined portion F are formed to such lengths as to prevent even a short adult from entering the net eye G.

In accordance with the lengths of the linear portion D, while the front end portion C of the optical fiber cable is being moved upward or downward, the winding times of the optical fiber cable onto the pre-disposed portions at the portion where it meets the pre-disposed portions are determined.

That is, if the length of the linear portion D is short, the winding times of the optical fiber cable are reduced, and contrarily, if the length of the linear portion D is long, the winding times of the optical fiber cable are increased. Accordingly, the length of the linear portion D and the size of the net eye G can be adjusted through the control of the winding times of the optical fiber cable.

Like this, the operation for producing the optical fiber cable net naturally starts at the lower end portion of the left side of the bee hive-like section A, but it may start at the lower end portion of the right side thereof, the upper end portion of the right side, or the upper end portion of the left side thereof. Further, as mentioned above, the operation for producing the optical fiber cable net naturally starts at the linear portion D, but it may start at the upward inclined portion E or the downward inclined portion F.

If the finished optical fiber cable net is used as a sensor, the front end portion C or the rear end portion B of the optical fiber cable is connected to an optical control instrument (OTDR: optical time-domain reflectometer or a power meter) from which a light source is outputted to sense cutting and bending.

The optical fiber cable net according to the present invention is made by means of a manual operation, but is desirably made by using a programmable knitting machine.

As described above, like this, the optical fiber cable net according to the present invention is made of one elongated optical fiber cable, without having any fixing clips, thereby greatly reducing the manufacturing cost and time, and the optical fiber cable is wound on the portions where it meets the pre-disposed cables to form the net eyes, which makes it impossible to increase the size of the net eye upon invasion or escape. Accordingly, the optical fiber cable net according to the present invention is very adequate to the sensor for a security fence. Further, as described above, the size of the net eye can be adjusted through the control of the winding times of the optical fiber cable.

Accordingly, the optical fiber cable net according to the present invention can be popularly used as the sensor for a security fence.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for producing an optical fiber cable net, the method comprising the steps of:

providing a single elongated optical fiber cable having a front end portion and a rear end portion, the single elongated optical fiber extending from the rear end portion to the front end portion without discontinuity;

repeatedly moving upward and downward a front end portion of said single elongated optical fiber cable from a lower end portion of a left side of a bee hive-like section along a line forming the bee hive-like section in such a manner as to allow the optical fiber cable to be disposed along the line forming the bee hive-like section, wherein, the line includes a first line, a second line and a third line, the front end portion of the single optical fiber cable moves upward along the first line to form a first plurality of half hexagons, and then when the front end of the single optical fiber cable has moved to an uppermost position of the first line, the front end portion of the single optical fiber cable changes a moving direction to a downward direction, and moves downward along the second line, such that the optical fiber cable disposed along the second line and the optical fiber cable disposed along the first line collectively form a first plurality of hexagons, and the optical fiber cable in the second line is wound a plurality of times onto the optical fiber cable disposed along the first line at regions where the second line overlaps the first line, and then when the front end of the single optical fiber cable has moved to a lowermost position of the second line, the front end portion of the single optical fiber cable changes a moving direction to an upward direction, and moves upward along the third line, such that the optical fiber cable disposed along the third line and the optical fiber cable disposed along the second line collectively form a second plurality of hexagons, and the optical fiber cable in the third line is wound a plurality of times onto the optical fiber cable disposed along the second line at regions where the third line overlaps the second line; and if the front end portion of the single optical fiber cable reaches a lower end portion of a right side of the bee hive-like section, sequentially passing the front end portion of the single optical fiber cable through respective net eyes of the right side of the bee hive-like section, respective net eyes of upper side thereof and respective net eyes of the left side thereof until the front end portion of the single optical fiber cable reaches the lower end portion of the left side of the bee hive-like section and finishing producing the optical fiber cable net.

2. An optical fiber cable net comprising:
one single elongated optical fiber cable having a front end and a rear end and extending from the rear end to the front end without discontinuity, wherein:
the optical fiber cable repeatedly extends upward and downward along a line to form a beehive shape having a plurality of hexagonal cells and a plurality of net eyes defined by the hexagonal cells;
the line includes a first line, a second line and a third line;
the optical fiber cable extends from the rear end upward along the first line to form a first plurality of half hexagons;
at an uppermost position of the first line, the optical fiber cable changes an extending direction to a downward direction, and extends downward along the second line, such that the optical fiber cable disposed along the second line and the optical fiber cable disposed along the first line collectively form a first plurality of hexagons, and the optical fiber cable in the second line is wound a plurality of times onto the optical fiber cable disposed along the first line at regions where the second line overlaps the first line;
at a lowermost position of the second line, the optical fiber cable changes an extending direction to an upward direction, and extends upward along the third line, such that optical fiber cable disposed along the third line and the optical fiber cable disposed along the second line collectively form a second plurality of hexagons, and the optical fiber cable in the third line is wound a plurality of times onto the optical fiber cable disposed along the second line at regions where the third line overlaps the second line;
after reaching a lower end portion of a right side of the beehive shape, the optical fiber cable extends to sequentially pass through respective net eyes of the right side of the beehive shape, respective net eyes of upper side thereof and respective net eyes of a left side thereof to reach a lower end portion of the left side of the beehive shape and then further extends to the front end of the optical fiber cable.

* * * * *